United States Patent [19]
Shimoda

[11] Patent Number: 6,081,099
[45] Date of Patent: Jun. 27, 2000

[54] CHARGING AND DISCHARGING CONTROL CIRCUIT AND CHARGING TYPE POWER SUPPLY DEVICE

[75] Inventor: Sadashi Shimoda, Chiba, Japan

[73] Assignee: Seiko Instruments Inc., Japan

[21] Appl. No.: 09/293,092

[22] Filed: Apr. 16, 1999

[30] Foreign Application Priority Data

Apr. 17, 1998 [JP] Japan .................................. 10-108316

[51] Int. Cl.[7] ................................................. H01M 10/46
[52] U.S. Cl. ............................................. 320/134; 320/136
[58] Field of Search ..................... 320/127, 128, 320/133, 134, 135, 136

[56] References Cited

U.S. PATENT DOCUMENTS

| 5,493,197 | 2/1996 | Eguchi et al. | 320/116 |
| 5,742,148 | 4/1998 | Sudo et al. | 320/134 |
| 5,841,265 | 11/1998 | Sudo et al. | 320/134 |
| 5,896,025 | 4/1999 | Yamaguchi et al. | 320/134 |

*Primary Examiner*—Edward H. Tso
*Attorney, Agent, or Firm*—Adams & Wilks

[57] ABSTRACT

In a delay circuit using the charging and discharging of a capacitor for setting a delay time, there is provided means for monitoring the terminal voltage across the capacitor, and recognizing whether it is a normal voltage, or not, by using an external signal.

15 Claims, 2 Drawing Sheets

CHARGING AND DISCHARGING CONTROL CIRCUIT AND CHARGING TYPE POWER SUPPLY DEVICE

BACKGROUND OF THE INVENTION

The present invention relates to a charging and discharging control circuit including a delay circuit using a capacitor for a secondary battery, and a charging type power supply device using the charging and discharging control circuit.

A conventional charging and discharging control circuit including a delay circuit using a capacitor for a secondary battery, and a charging type power supply device using the charging and discharging control circuit is shown in FIG. 2. In general, the charging type power supply devices have been put on the market as battery packs used in notebook PCs, camera integrated VTRs, or the like.

An external charger is connected to external terminals 106 and 107 to charge a secondary battery 103. When the secondary battery 103 passes into an over-charge state after the charging has progressed, a comparator is inverted so that a delay circuit 102 starts to charge a capacitor 104. When the capacitor reaches a given voltage, the delay circuit 102 outputs a signal that turns a switch element 101 off to stop charging the secondary battery 103.

In the case of the delay circuit shown in FIG. 2, which uses the charge and discharge operation of the capacitor the device, suffers from the following problem.

In the delay circuit described above, when the capacitor 104 fails and becomes placed in a short-circuiting state, a terminal 108 connected with the capacitor 104 is always fixed to a ground potential.

In this situation, when the secondary battery 103 starts to be charged, and the secondary battery is over-charged, the capacitor 104 must start to be charged. However, because the capacitor 104 is in a state of failure, a voltage at the terminal 108 is at ground potential and does not rise. Accordingly, the delay circuit 102 does not output a signal that makes the switch element 101 turn off. As a result, the charging operation progresses, and the secondary battery 103 ignites in the case where it is, for example, a lithium ion secondary battery.

In general, in a circuit provided for protection or an improvement in safety, some protection must be provided even if failure occurs. That is, so-called "fail safe operation" must be carried out.

SUMMARY OF THE INVENTION

In order to solve the above-mentioned problem, according to the present invention, in a delay circuit using the charging and discharging operation of a capacitor for setting a delay time, there is provided means for monitoring a terminal voltage of the capacitor according to an external signal to recognize whether or not the terminal voltage is normal.

DETAILED DESCRIPTION

Figure 1:
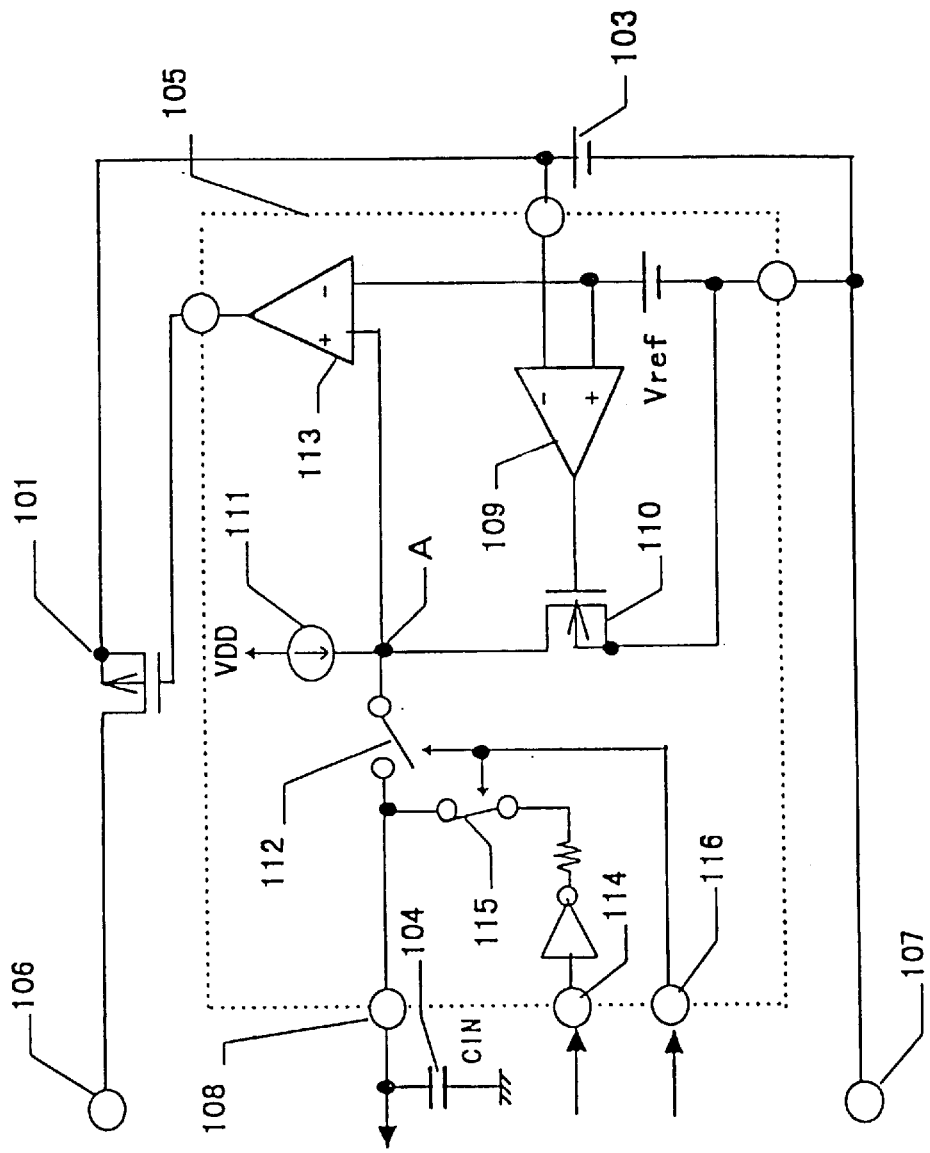
FIG. 1 is an explanatory diagram showing a charging type power supply device using a charging and discharging control circuit in accordance with the present invention.
Figure 2:
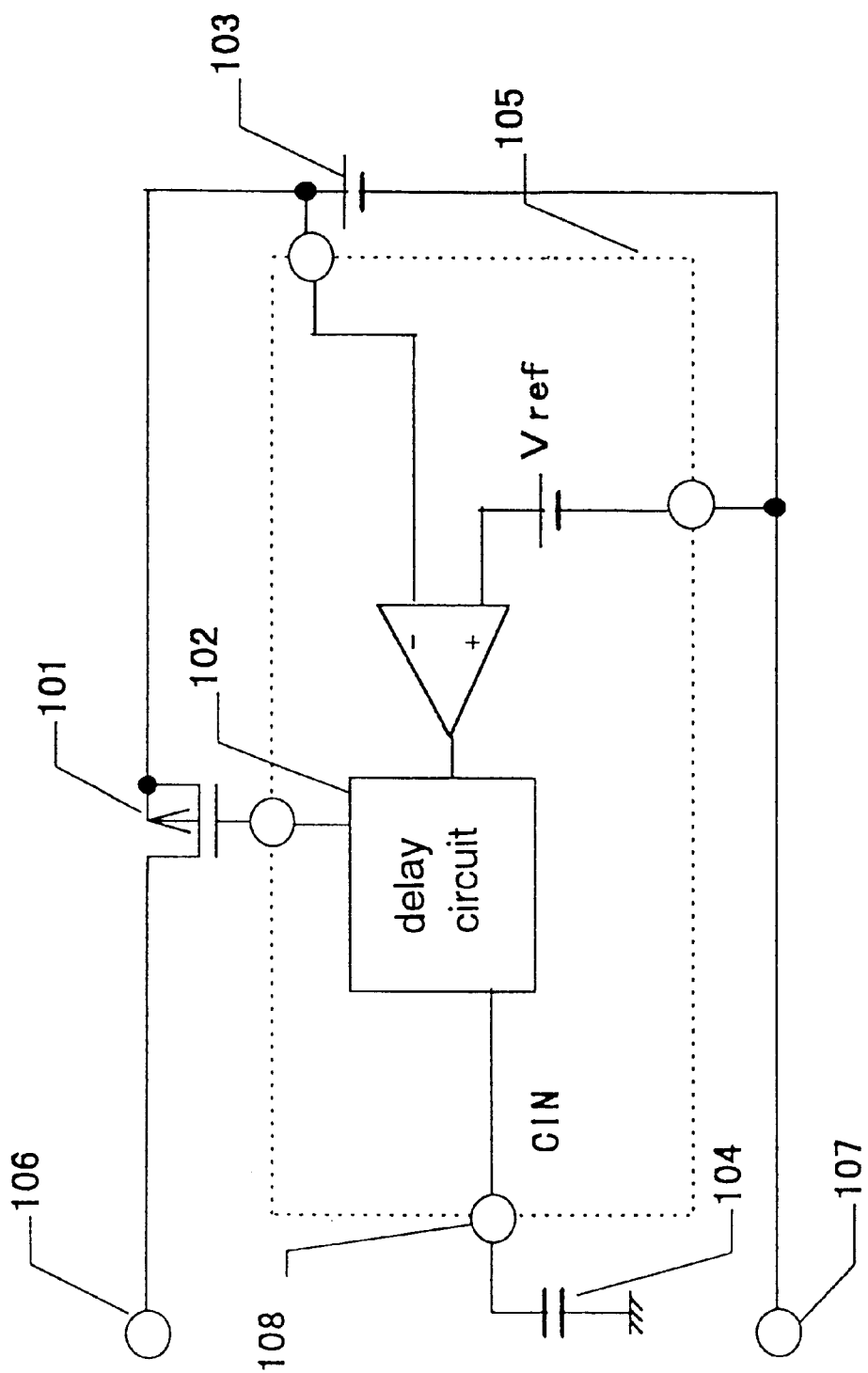
FIG. 2 is an explanatory diagram showing a conventional charging type power supply device using a charging and discharging control circuit.

An embodiment of the present invention is shown in FIG. 1. External connection terminals 106 and 107 are terminals for an external connecting charger. The external connection terminal 106 is connected to a secondary battery 103 through a charge suspension switch element 101, and then connected to the external terminal 107. The positive voltage of the secondary battery 103 is input to a charging and discharging control circuit 105. The charging and discharging control circuit 105 can be formed into an integrated circuit. The positive voltage of the secondary battery 103 is input to a comparator 109 where it is compared with an output voltage of a reference voltage circuit Vref. The output of the comparator 109 is input to the gate of a transistor 110 to turn on/off the transistor 110. One end of the transistor 110 is connected with a constant-current source 111. Its node A is connected through a switch 112 to a capacitor 104 which is connected to a terminal 108, and is also input to a microcomputer or the like. In addition, the node A is input to a comparator 114 where it is compared with the output of the reference voltage circuit Vref to control the on/off operation of the switch element 101. On the other hand, a signal from a microcomputer or the like is input to a terminal 114 and connected to the terminal 108 through an inverter, a resistor, and a switch 115. Also, another signal from the microcomputer or the like is input to a terminal 116 to control the open/close operation of the switches 112 and 115.

Subsequently, the operation of this embodiment will be described. The secondary battery 103 is charged by the charger connected to the external terminals 106 and 107. In this situation, the switch element 101 is turned on. When the voltage across the secondary battery 103 rises until the voltage comes to a charge suspension voltage, that is, an over-charge state, as charging progresses, the comparator 109 is inverted to a low voltage. As a result, the transistor 110 turns off. In this state, the switch 112 is closed, and a current from the constant-current source 111 starts to charge the capacitor 104. This charging allows a voltage at the node A to rise, and when the voltage exceeds the voltage across the reference voltage circuit Vref which is input to the comparator 113, the comparator 113 is inverted to a high voltage to turn off the switch element 101. A period of time where the comparator 109 is inverted to the low voltage, and the comparator 113 is inverted to the high voltage corresponds to a delay time. As a result, the operation of charging the secondary battery 103 is suspended after the delay time. The above description is applied to a case where the system normally operates.

However, the system does not normally operate in a case where the capacitor 104 fails for any reason, and internal short-circuiting occurs. In other words, because the terminal 108 is fixed to the ground potential, the voltage at the node A does not rise even if the current from the constant-current source 111 flows thereto. This prevents the switch element 101 from turning off to continue to charge the secondary battery 103, resulting in a very dangerous condition. However, in the present invention, the signal from the microcomputer or the like which is input to the terminals 114 and 116 enables this dangerous condition to be prevented. In particular, the signal input from the terminal 116 makes the switch 112 turn off and the switch 115 turn on. Subsequently, the signal input from the terminal 114 is set at a low level signal, and a high level signal is output from terminal 108. In this situation, if the capacitor 104 fails due to internal short-circuiting, the terminal 108 maintains the low voltage. This is input to an A/D converter such as a microcomputer where this voltage is read by the A/D converter. Since the microcomputer outputs the low signal to the terminal 114, the level at the terminal 108 is expected to be at a high voltage. However, because the voltage at the terminal 108 is low due to short-circuiting, the microcomputer judges that the capacitor 104 is defective. In this case, the microcomputer can provide an alarm through some means such that the charging operation is immediately suspended or the use of the battery is suspended. On other hand, the present invention is effective even in the case where the terminal 108 is abnormally short-circuited to the high voltage such as VDD. That is, when the microcomputer inputs a high level signal to the terminal 114, a high voltage is applied to the microcomputer due to some abnormality although the terminal 108 should become a low level voltage. The microcomputer judges that this to be an abnormal state, and can immediately conduct the same processing as that described above.

In this embodiment, the judgement in suspension of the charging operation is made using the comparator 113. Alternatively, the inhibition of the charging operation may be judged using a signal from the terminal 108 to the microcomputer. In particular, it is checked whether the terminal voltage of the capacitor 104 input to the A/D converter such as a microcomputer becomes a given voltage, or not. If the terminal voltage reaches the given voltage, the microcomputer makes the charger suspend the charging operation, or issues a control signal such that the switch element 101 is turned off although its connection is not shown in FIG. 1.

This embodiment is described with an example in which the charging and discharging control circuit 105 has only the charging control function. However, in general, the charging and discharging control circuit 105 additionally provides over-current inhibiting function or an over-discharge inhibiting function by the provision of a switch element for over-discharge inhibition. In this example, this embodiment is applicable in the case where a delay circuit is required as with the over-charge inhibiting function.

Although a preferred embodiment is described above, the present invention can be implemented even if the input terminal of the comparator and the output logic are modified or varied.

The above-described embodiment can be formed of a semiconductor integrated circuit. In this case, it is difficult to build a capacitor in the integrated circuit, and the capacitor is connected to the external. Therefore, the effectiveness of the present invention is exhibited.

As described above, because only the addition of a simple circuit makes it possible to check an abnormal state in which the capacitor is internally short-circuited, or the terminal is short-circuited to the supply voltage potential or the ground potential, the present invention can enhance the reliability of the entire device and improve the safety.

What is claimed is:

1. A charging and discharging control circuit for controlling the charging and discharging operation of a secondary battery, comprising: detecting means for detecting whether a secondary battery is in one of an over-charge state, an over-discharge state and an over-current state and generating a corresponding output signal; delaying means for delaying the output signal of the detecting means, producing a delayed output signal, and supplying the delayed output signal to a switch element for opening a circuit containing the secondary battery to stop a current from flowing through the secondary battery; and checking means for checking whether or not the delaying means is operating properly.

2. A charging type power supply device comprising: a secondary battery; an external terminal connected to the secondary battery; a switch element disposed between the battery and the external terminal; a charging and discharging control circuit including a delay circuit connected in parallel with the secondary battery for controlling the switch element; and checking means for checking whether or not the delaying means is operating properly.

3. A charging and discharging control circuit as claimed in claim 1; wherein the checking means for checking whether or not the delaying means is operating properly receives a first signal from control means and outputs a second signal responsive to the first signal to the control means.

4. A charging and discharging control circuit according to claim 2; wherein the checking means for checking whether or not the delaying means is operating properly comprises means for receiving a first signal from control means microcomputer and outputting a second signal responsive to the first signal to the control means.

5. A charging and discharging control circuit according to claim 1; wherein the checking means includes means for opening the switch element when the delaying means is not operating properly.

6. A charging and discharging control circuit according to claim 1; wherein the means for delaying comprises a charging circuit having a capacitor.

7. A charging and discharging control circuit according to claim 6; wherein the checking means comprises a circuit connected to the capacitor for supplying a signal to the capacitor to determine whether the capacitor is capable of charging or discharging.

8. A charging and discharging control circuit according to claim 7; wherein the circuit comprises a microcomputer circuit.

9. A charging and discharging control circuit according to claim 8; wherein the detecting means comprises a comparator for comparing an output voltage of the secondary battery with a reference voltage and outputting a signal based on the comparison result.

10. A charging and discharging control circuit according to claim 1; wherein the delaying means comprises a transistor disposed in a current path for receiving the output signal of the detecting means and closing the current path when the output signal of the detecting means indicates one of an overcharge, an overdischarge and an overcurrent state of the secondary battery, a constant current circuit connected to the transistor, and a capacitor connected to a connection node between the transistor and the constant current source for being charged by the constant current source when the current path is closed by the transistor.

11. A charging and discharging control circuit according to claim 10; wherein the checking means comprises a circuit connected to the capacitor for supplying a signal to the capacitor to determine whether the capacitor is capable of charging or discharging.

12. A charging and discharging control circuit according to claim 11; wherein the circuit comprises a microcomputer circuit.

13. A charging and discharging control circuit according to claim 10; wherein the detecting means comprises a comparator for comparing an output voltage of the secondary battery with a reference voltage and outputting a signal based on the comparison result.

14. A charging and discharging control circuit for controlling the charging and discharging operation of a secondary battery, comprising: detecting means for detecting whether a secondary battery is in one of an over-charge state, an over-discharge state and an over-current state and generating a corresponding output signal; means for delaying the output signal of the detecting means, producing a delayed output signal, and supplying the delayed output signal to a switch element for opening a circuit containing the secondary battery to stop a current from flowing through the secondary battery; and checking means for checking whether or not the delaying means is operating properly; wherein the checking means includes means for receiving a first signal from control means to output a second signal responsive to the first signal to the control means.

15. A charging type power supply device comprising: a secondary battery; an external terminal connected to the secondary battery; a switch element disposed between the battery and the external terminal; a charging and discharging control circuit including a delay circuit connected in parallel with the secondary battery for controlling the switch element; and checking means for checking whether or not the delaying means is operating properly; wherein the checking means comprises means for receiving a first signal from control means and outputting a second signal responsive to the first signal to the control means.

* * * * *